(12) United States Patent
Yoshida

(10) Patent No.: US 7,475,824 B2
(45) Date of Patent: Jan. 13, 2009

(54) INFORMATION INPUT/OUTPUT METHOD USING DOT PATTERN

(76) Inventor: Kenji Yoshida, 26-21-1301, Koishikawa 3-chome, Bunkyo-ku, Tokyo 112-0002 (JP)

( * ) Notice: Subject to any disclaimer, the term of this patent is extended or adjusted under 35 U.S.C. 154(b) by 266 days.

(21) Appl. No.: 10/502,319

(22) PCT Filed: Mar. 17, 2003

(86) PCT No.: PCT/JP03/03162

§ 371 (c)(1), (2), (4) Date: Apr. 11, 2005

(87) PCT Pub. No.: WO2004/084125

PCT Pub. Date: Sep. 30, 2004

(65) Prior Publication Data

US 2005/0173544 A1    Aug. 11, 2005

(51) Int. Cl.
*G06K 19/06* (2006.01)
(52) U.S. Cl. .................................................. 235/494
(58) Field of Classification Search ................. 235/487, 235/494

See application file for complete search history.

(56) References Cited

U.S. PATENT DOCUMENTS 6,732,927 B2 *  5/2004  Olsson et al. ................ 235/454

FOREIGN PATENT DOCUMENTS

| JP | 07-098751 A | 4/1995 |
|----|----|----|
| JP | 2000-123129 A | 4/2000 |
| JP | 2003-503905 A | 1/2003 |
| WO | 01/48685 A1 | 7/2001 |

OTHER PUBLICATIONS

Search Report mailed Aug. 12, 2003 in Corresponding International Patent Application No. PCT/JP03/03162.

* cited by examiner

*Primary Examiner*—Jamara A Franklin
(74) *Attorney, Agent, or Firm*—Westerman, Hattori, Daniels & Adrian, LLP.

(57) ABSTRACT

A plurality of lattice dots are disposed in a rectangular shape and set as a block, and they are regularly and continuously disposed, and a dot that forms one of the lattice dots which exists in the block is disposed by being shifted unidirectionally and is set as a key dot, and by setting the key dot as a representative point, a plurality of information dots are disposed, and by setting a center which was surrounded by the lattice dots of four points as a hypothetical point, and by setting this as a start point of a vector, at an end point of which, a plurality of information dots which have various information are arranged in accordance with a predetermined rule by a dot code generation algorithm to thereby generate a dot pattern.

16 Claims, 17 Drawing Sheets $i_{32}\ i_{31}\ i_{30}\ i_{29}\ i_{28}\ i_{27}\ i_{26}\ i_{25}\ i_{24}\ i_{23}\ i_{22}\ i_{21}\ i_{20}\ i_{19}\ i_{18}\ i_{17}\ i_{16}\ i_{15}\ i_{14}\ i_{13}\ i_{12}\ i_{11}\ i_{10}\ i_{9}\ i_{8}\ i_{7}\ i_{6}\ i_{5}\ i_{4}\ i_{3}\ i_{2}\ i_{1}$ 00  01  11  10  00  00  00  00  11  01  10  01  01  10  10  00
000 010 110 100 000 000 000 000 110 010 100 010 010 100 100 000

$I_{16}\ I_{15}\ I_{14}\ I_{13}\ I_{12}\ I_{11}\ I_{10}\ I_{9}\ I_{8}\ I_{7}\ I_{6}\ I_{5}\ I_{4}\ I_{3}\ I_{2}\ I_{1}$ key-dot

Fig. 11

| | | | | | |
|---|---|---|---|---|---|
| $K_1$ | 001 | $R_1$ | 000 | $I_1$ | 001 |
| $K_2$ | 010 | $R_2$ | 010 | $I_2$ | 100 |
| $K_3$ | 110 | $R_3$ | 110 | $I_3$ | 100 |
| $K_4$ | 011 | $R_4$ | 100 | $I_4$ | 111 |
| $K_5$ | 000 | $R_5$ | 101 | $I_5$ | 101 |
| $K_6$ | 110 | $R_6$ | 111 | $I_6$ | 101 |
| $K_7$ | 001 | $R_7$ | 001 | $I_7$ | 010 |
| $K_8$ | 100 | $R_8$ | 011 | $I_8$ | 111 |
| $K_9$ | 101 | $R_9$ | 111 | $I_9$ | 100 |
| $K_{10}$ | 011 | $R_{10}$ | 011 | $I_{10}$ | 110 |
| $K_{11}$ | 010 | $R_{11}$ | 000 | $I_{11}$ | 010 |
| $K_{12}$ | 100 | $R_{12}$ | 010 | $I_{12}$ | 110 |
| $K_{13}$ | 111 | $R_{13}$ | 100 | $I_{13}$ | 011 |
| $K_{14}$ | 001 | $R_{14}$ | 110 | $I_{14}$ | 111 |
| $K_{15}$ | 110 | $R_{15}$ | 101 | $I_{15}$ | 011 |
| $K_{16}$ | 101 | $R_{16}$ | 001 | $I_{16}$ | 110 |

Fig. 15 information-block

| $\alpha I_{13}$ | $\alpha I_{14}$ | $\alpha I_{15}$ | $\alpha I_{16}$ |
|---|---|---|---|
| $\alpha I_9$ | $\alpha I'_{10}$ | $\alpha I_{11}$ | $\alpha I'_{12}$ |
| $\alpha I'_5$ | $\alpha I_6$ | $\alpha I'_7$ | $\alpha I_8$ |
| $\alpha I_1$ | $\alpha I'_2$ | $\alpha I_3$ | $\alpha I'_4$ |

|     |     |     |     |     |     |     |     |
|-----|-----|-----|-----|-----|-----|-----|-----|
| $I_{16}$ | $I_{13}$ | $I_4$ | $I_1$ | $I_{16}$ | $I_{13}$ | $I_4$ | $I_1$ |
| $I_{15}$ | $I_{14}$ | $I_3$ | $I_2$ | $I_{15}$ | $I_{14}$ | $I_3$ | $I_2$ |
| $I_{12}$ | $I_9$ | $I_8$ | $I_5$ | $I_{12}$ | $I_9$ | $I_8$ | $I_5$ |
| $I_{11}$ | $I_{10}$ | $I_7$ | $I_6$ | $I_{11}$ | $I_{10}$ | $I_7$ | $I_6$ |
| $I_{16}$ | $I_{13}$ | $I_4$ | $I_1$ | $I_{16}$ | $I_{13}$ | $I_4$ | $I_1$ |
| $I_{15}$ | $I_{14}$ | $I_3$ | $I_2$ | $I_{15}$ | $I_{14}$ | $I_3$ | $I_2$ |
| $I_{12}$ | $I_9$ | $I_8$ | $I_5$ | $I_{12}$ | $I_9$ | $I_8$ | $I_5$ |
| $I_{11}$ | $I_{10}$ | $I_7$ | $I_6$ | $I_{11}$ | $I_{10}$ | $I_7$ | $I_6$ |

B1 block ↓ (top, between cols 2-3)
B2 block ↓ (top, between cols 6-7)
B4 block ↑ (bottom, between cols 2-3)
B3 block ↑ (bottom, between cols 6-7)

INFORMATION INPUT/OUTPUT METHOD USING DOT PATTERN

TECHNICAL FIELD

This invention relates to an information input and output method by use of a dot pattern which has various information and programs inputted and outputted, by optically reading out dot pattern information which was formed on a printed material etc.

BACKGROUND INVENTION

In the prior art, an information output method, which reads out a bar code printed on a printed material etc., and which has information such as a sound etc. outputted, has been proposed. For example, such a method that information which coincides with given key information has been stored in storage means in advance and information etc. is outputted by searching from the read key by use of a bar code reader has been proposed.

Also, so as to be able to output a lot of information and programs, such a technology that, generated is a dot pattern in which minute dots were disposed by a predetermined rule, and a dot pattern which was printed on a printed material etc. is imported as image data by a camera, and digitized to have sound information outputted, has been proposed.

However, the above-described method which has a sound etc. outputted by use of a conventional bar code has such a problem that a bar code printed on a printed material etc. is unpleasant to the eye. Also, since a bar code is large and takes possession of a part of a page space, it has such a problem that, when a bar code is large as just described, it is impossible from the view point of a layout to assign a good many of bar codes in a way easy to understand with respect to each meaningful character and object which appear in partial text and sentence or in images of a photograph, a painting, a graphic.

A dot pattern is imported as image data by a camera, and the image data is digitized into 256 tones of an achromatic color, and in order to make recognition of a dot easy, a change of tones is differentiated, to sharpen an edge of a dot. Then, data of 256 tones is changed to a binary digit of white or black. By realizing this change to a binary digit, when a dot is printed on a page space, there occurs a print error of a dot due to shear and blur in printing, misalignment on the occasion of having conducted pixelation. In the prior art, the suchlike print error is error-checked by a parity check. However, these error checks have such problems that they are not of a print error check with respect to each dot, but are of an error check to a lump of data which is obtained from a plurality of dots, and it is not possible to ascertain in which dot a print error occurred, and that a scope of image pickup of a camera has to be taken widely.

Furthermore, they have such a problem that there occurs distortion in an imaged dot pattern due to distortion of a lens, cross shot, expansion and contraction of a page space, curvature of a medium surface, and deflection at the time of printing, and in order to compensate this, an advanced technical capability is required.

This invention is one which was invented in order to solve such problems. That is, an object of this invention is to provide an information input and output method by use of a dot pattern which defines a goodly amount of data by use of a dot pattern, by imparting a different function to each dot of a dot pattern to be displayed on a printed material etc., and on the occasion of informatization from that dot pattern, can recognize directionality and informatize it expeditiously, and can check an error of a layout state of dots, and furthermore, can heighten security.

DISCLOSURE OF THE INVENTION

According to this invention, provided is an information input and output method by use of a dot pattern characterized in that, a plurality of lattice dots (4) are disposed in a rectangular shape on a medium surface of a printed material etc., which is then, set as a block, and the blocks are regularly and continuously disposed, and such a dot that 1 lattice dot (4) located in the block was disposed by being shifted unidirectinally is set as a key dot (2), and, by setting the key dot (2) as a representative point, they are disposed at a circumference of the key dot (2), and by setting a center which was surrounded by lattice dots (4) of 4 points as a hypothetical point, and by setting this as a start point, at an end point which was represented by a vector, a plurality of information dots (3) which have various information recognized are disposed in accordance with a predetermined rule by a dot code generation algorithm to generate a dot pattern (1), and a block which configures the dot pattern (1) is imported as image data by a camera, and, from a numerical value which was calculated by digitizing this, information, a program are outputted.

By the above-described camera, recognized is a direction of the key dot (2) of the dot pattern (1), and dots which were disposed at the end point of the vector on the basis of the direction as a standard are set as the information dot (3). A plurality of the information dot (3) can be displayed around the hypothetical point of the lattice dot (4) as a center.

In the information/program input and output method of the above-described configuration, the dot pattern (1) which was formed on a medium of a printed material etc. by use of an information output device, a personal computer, a PDA or a portable telephone, etc., is imported as image data by a camera. This camera recognizes the printed dots in accordance with the predetermined rule in these dot pattern (1), and digitizes it, and has information and program outputted from the calculated numerical value.

In particular, the dot pattern (1) is imported as its image data by a camera, and firstly, the lattice dot (4) is recognized and then, the key dot (2) is extracted, and directionality is recognized by the key dot (2), and its direction can be used as a parameter. Then, by extracting the information dot (3) which was disposed at a circumference of this key dot (2), it is possible to have information and program outputted expeditiously.

Since, in the dot pattern (1), the lattice dot (4) is disposed, on the occasion of importing this dot pattern (1) as image data by a camera, it is possible to correct distortion of a lens, cross shot, expansion and contraction of a page space, curvature of a medium surface, and deflection at the time of printing. Concretely speaking, as a function for correction which converts distorted lattice dots (4) of 4 points into an original square, obtained is $$(X_n, Y_n) = f(X'_n, Y'_n),$$

and information dots are corrected by the identical function to thereby obtain a vector of correct information dots (3).

In case that data to be defined in the information dots (3) was bit-displayed, for use in an error check, by giving redundancy to 1 bit, out of 1 piece of the information dots (3), and by treating a high bit of data which is obtained from the information dot ($I_n$) and a low bit of data which is obtained from an information dot $I_{n+1}$ as identical, in such a state that the information dot (3) was displayed on the medium surface, when a high bit of data which is obtained from its information dot ($I_n$) and a low bit of data which is obtained from an information dot ($I_{n+1}$) are not identical, it is judged that the information dot (3) is not displayed at an appropriate position.

In order to use the information dot (3) for an error check, by assigning "0" or "1" to a low bit, in such a state that the information dot (3) was displayed on the medium surface, when there is misalignment from a position where the information dot (3) is disposed, to a position where disposed is an information dot (3) which is adjacent and has another data, it is judged that the information dot (3) is not displayed at an appropriate position.

Assuming that a direction of the key dot (2) is defined as a upward direction, and data which is defined in an information dot of that direction is "0", by disposing the information dot (3) in any one of equally spaced 8 directions, and assigning "0" to a low bit in order to carry out an error check, in such a state that the information dot (3) was displayed on the medium surface, when the information dot (3) is located in an inclined direction other than up and down or left and right directions around the hypothetical point as a center, it is judged that the information dot (3) is not displayed at an appropriate position.

Assuming that a direction of the key dot (2) is defined as a upward direction, and data which is defined in an information dot of that direction is "0", by disposing the information dot (3) in any one of equally spaced 8 directions, and assigning "1" to a low bit in order to carry out an error check, in such a state that the information dot (3) was displayed on the medium surface, when the information dot (3) is located in up and down or left and right directions other than an inclined direction around the hypothetical point as a center, it is judged that the information dot (3) is not displayed at an appropriate position.

It is also desirable to assign "0" and "1" to a low bit alternately, in order to carry out an error check of the information dot (3), and to dispose information dots (3) all around.

By this, it is possible to carry out an error check as to whether or not the information dot (3) of the dot pattern (1) is inputted by being shifted to an adjacent direction, due to shear in printing to the medium surface, expansion and contraction of the medium, misalignment on the occasion of having conducted pixelation. In particular, in case that the information dot (3) was inputted by being shifted to a rotational direction of a concentric shape around the hypothetical point as a center, it is possible to carry out a check of an error by 100%.

In order to encrypt data $K_n$ which was defined in the information dot $I_n$ of the dot pattern (1) so as to make it impossible to be read visually, performed is an arithmetic operation which was represented by the function f to the data $K_n$, and $I_n=f(K_n)$ is represented by the dot pattern (1), and the dot pattern (1) is imported as image data by a camera, and the data $K_n$ is calculated by $K_n=f^{-1}(I_n)$.

In order to eliminate regularity of the dot pattern (1) so as to make it impossible to visually read data of the information dot (3), a difference of adjacent 2 lines of information dots (3) is set as data which is defined in the information dot (3), and by the information dot $I_n$ which is calculated by adding the defined data $K_n$ to a front line information dot $I_n$ among the adjacent ones, the dot pattern (1) is generated and disposed.

By this, it becomes impossible to visually read the dot pattern (1) which was printed on a medium surface, so that it is possible to heighten security. Furthermore, on the occasion of having printed the dot pattern (1) on a medium surface, the information dot (3) is disposed randomly, and a pattern disappears, and it is possible to obscure the dot pattern.

In the dot pattern (1), in order to define a region in which there is no information, or in order not to import different data across a border in a border of a region and a region, as a dummy dot (5) in which data is not defined, it is possible to dispose a dot at a central position of the lattice dots (4) of 4 points.

when the dot pattern (1) is imported as its image data by a camera, by supplementing coordinate values by a direction of the dot pattern (1) which is obtained from the key dot (2) after calculated were X, Y coordinate values at a position of the key dot (2) which is a representative point of information, increment values of the X, Y coordinate values at an adjacent representative point and a distance from an image pickup center to the key dot (2) whose X, Y coordinate values were calculated, the X, Y coordinate values at the image pickup center are calculated.

When a block of the dot pattern (1) is imported as its image data by a camera, in such a region that identical data is defined in each block or such a region that X, Y coordinate values are defined, by starting to read from the information dot (3) which is located at a circumference around the image pickup center of the camera, reading the information dot (3) sequentially, and reading the information dot (3) which corresponds to one block portion, the dot pattern (1) is read at a minimum area from the image pickup center of the camera, and data at the image pickup center position is calculated.

When the dot pattern (1) is read as image data by a camera, on the occasion that there occurs an error as to the information dot (3), read is an information dot (3) which corresponds to the above-mentioned information dot (3) and is the closest, and an error correction is carried out.

The above-mentioned block is divided into sub-blocks, and individually independent information is given to each sub-block, and thereby, the dot pattern (1) is read at a smaller area than the block unit, from the image pickup center of the camera, and also, with respect to each sub-block, an error check and an error correction are carried out.

BRIEF DESCRIPTION OF THE DRAWINGS

FIG. 11 is an explanatory view which shows such a state that the information dots $I_1$ through $I_{16}$ were arranged in a line in order to explain about security of the information dot.

FIG. 15 is an explanatory view which shows a dot pattern generating method with removed regularity, and one which shows an information block which is used as a dot pattern.

FIG. 16 is an explanatory view which shows a dot pattern generating method with removed regularity, and one which shows a data block to be recorded in the dot pattern.

FIG. 19 is an explanatory view which shows information dots of four block portions.

BEST MODE FOR CARRYING OUT THE INVENTION

Hereinafter, a preferred mode for carrying out this invention will be described with reference to the drawings.

Figure 1:
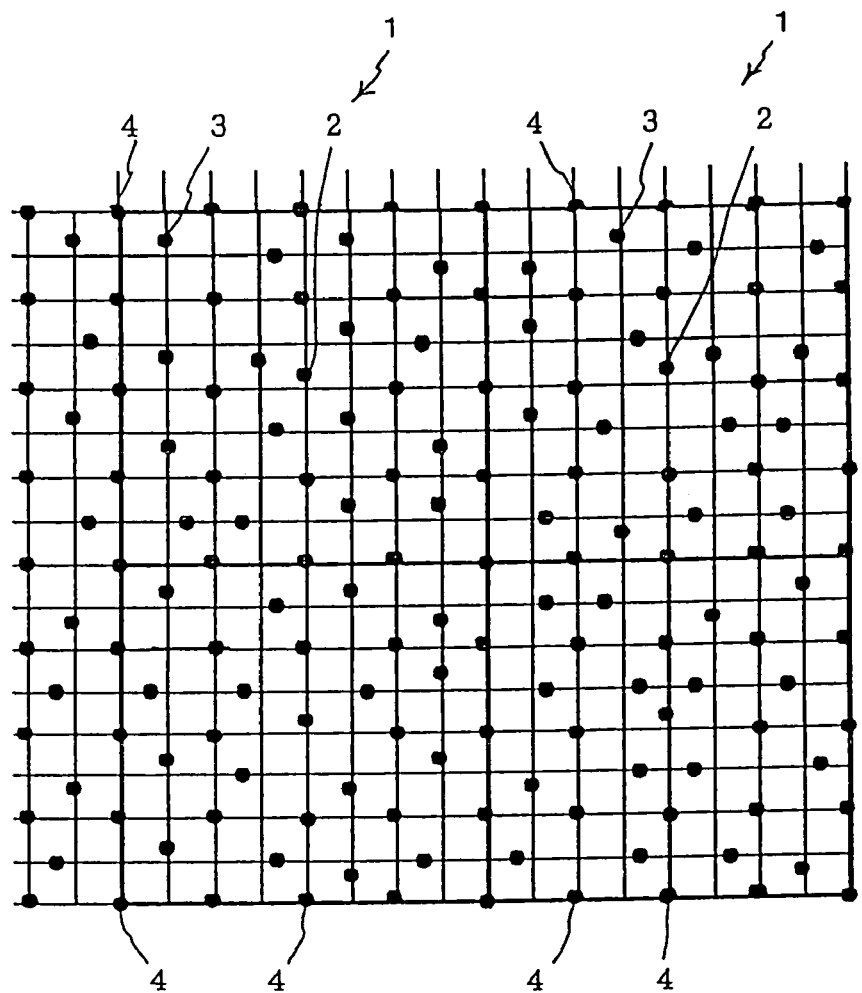
FIG. 1 is an explanatory view which shows one example of a dot pattern of this invention.
Figure 2:
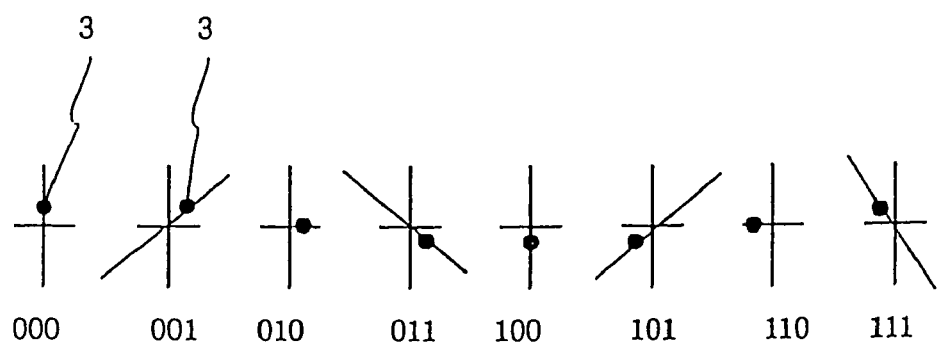
FIG. 2 is an enlarged view which shows one example of information dots of a dot pattern.

FIG. 1 is an explanatory view which shows one example of a dot pattern of this invention. FIG. 2 is an enlarged view which shows one example of information dots of the dot pattern and bit display of data which was defined therein. FIGS. 3(a), (b) are explanatory views which show the information dots in which a key dot was disposed at a center.

An information input and output method by use of a dot pattern of this invention comprises means for generating a dot pattern 1, means for recognizing the dot pattern 1, and means for outputting information and program from this dot pattern 1. That is, the dot pattern 1 is imported as image data by a camera, and firstly, a lattice dot is extracted, and then, a key dot 2 is extracted by such a fact that a dot is not hit at such a position that there is the lattice dot by nature, and then, an information dot 3 is extracted, and thereby, digitalization is realized so that an information region is extracted and digitalization of information is realized, and by that numerical value information, from this dot pattern 1, information and program is outputted. For example, from this dot pattern 1, information such as a sound etc. and program is made to be outputted to an information output device, a personal computer, a PDA or a portable telephone, etc.

In generation of the dot pattern 1 of this invention, by a dot code generation algorithm, in order to have information such as a sound etc. recognized, minute dots, i.e., the key dot 2, the information dot 3, the lattice dot 4 are arranged in accordance with a predetermined rule. As shown in FIG. 1, in a block of the dot pattern 1 which represents information, around the key dot 2 as a center, the lattice dots 4 of 5×5 are disposed, and the information dot 3 is disposed at a circumference of a hypothetical point which is located at a center surrounded by the lattice dots 4 of 4 points. In this block, arbitrary numerical value information is defined. In addition, in an example shown in FIG. 1, shown is such a state that four pieces of blocks (within a frame of a thick line) of the dot pattern 1 was arranged in a line. In this regard, however, as a matter of course, the dot pattern 1 is not limited to the four blocks.

To one block, one corresponding information and program can be outputted, or to a plurality of blocks, one corresponding information and program can outputted.

The lattice dot 4, on the occasion of importing this dot pattern 1 as image data by a camera, can correct distortion of a lens, cross shot, expansion and contraction of a page space, curvature of a medium surface, and deflection at the time of printing. Concretely speaking, as a function for correction which converts distorted lattice dots 4 of 4 points into an original square, obtained is $$(X_n, Y_n) = f(X'_n, Y'_n),$$

and information dots are corrected by the identical function to thereby obtain a vector of correct information dots 3.

When the lattice dot 4 is disposed in the dot pattern 1, such image data that this dot pattern 1 was imported by a camera corrects distortion due to a camera, and therefore, even when image data of the dot pattern 1 is imported by use of a widely used type camera which used a lens with a high distortion rate, it is possible to recognize accurately. Also, even if reading is carried out by having a camera inclined against a surface of the dot pattern 1, it is possible to recognize that dot pattern 1 accurately.

The key dot 2, as shown in FIG. 1, is a dot which was disposed by unidirectionally shifting one lattice dot 4 which is located approximately at a center position of the lattice dots 4 arranged in a rectangular shape. This key dot 2 is a representative point of the dot pattern 1 of one block portion which represents the information dot 3. For example, it is one in which the lattice dot 4 at the center of a block of the dot pattern 1 was shifted upwards by 0.2 mm. In case that the information dot 3 represents X, Y coordinate values, such a position that the key dot 2 was shifted downwards by 0.2 mm becomes a coordinate point. In this regard, however, this numerical value is not limited to this, and can be varied in accordance with large and small of a block of the dot pattern 1.

The information dot 3 is a dot which has various information recognized. This information dot 3 is, by setting the key dot 2 as a representative point, disposed at a circumference thereof, and by setting a center surrounded by the lattice dots 4 of 4 points as a hypothetical point, and by setting this as a start point, disposed at an end point which was represented by a vector. For example, this information dot 3 is surrounded by the lattice dots 4, and as shown in FIG. 2, a dot which was away from that hypothetical point by 0.2 mm has a direction and length which are represented by a vector, and therefore, disposed in 8 directions by having it rotated by 45 degree in a clockwise direction, and represents 3 bits. Therefore, it is possible to represent 3 bits×16 pieces=48 bits by the dot pattern 1 of one block.

In addition, in the example shown in the figure, it is disposed in 8 directions and represents 3 bits, but it is not limited to this, and it is possible to dispose in 16 directions and to represent 4 bits, and it is of course possible to modify variously.

It is desirable that a diameter of the key dot 2, the information dot 3 or the lattice dot 4 is approximately 0.1 mm, taking appearance, precision of printing to paper quality, resolution of a camera and optimum digitalization into consideration.

Also, taking necessary information amount to an image pickup area and false recognition of various kinds of dots 2, 3, 4 into consideration, it is desirable that an interval of the lattice dots 4 is in the vicinity of 1 mm vertically and horizontally. Taking false recognition of the lattice dot 4 and the information dot 3 into consideration, it is desirable that misalignment of the key dot 2 is in the vicinity of 20% of the lattice interval.

It is desirable that an interval between this information dot 3 and the hypothetical point which was surrounded by the lattice dots 4 of 4 points is an interval of approximately 15-30% of an interval between adjacent hypothetical points. This is because, if a distance between the information dot 3 and the hypothetical point is far from this interval, mutual dots are prone to be viewed as a large lump, and become ugly as the dot pattern 1. Adversely, this is because, if a distance between the information dot 3 and the hypothetical point is closer than this interval, it becomes difficult to carry out recognition of whether it is the information dot 3 to which vector directionality was given by setting any one of adjacent hypothetical points as a center.

For example, the information dot 3, as shown in FIG. 3(a), a lattice interval for disposing $I_1$ through $I_{16}$ around the key dot 2 as a center in a clockwise direction is 1 mm, which realizes 3 bits×16=48 bits by 4 mm×4 mm.

In addition, individually independent information contents are possessed in a block, and a sub-block which is not influenced by another information content can be further disposed. FIG. 3(b) is one which showed this in the figure, sub-blocks configured by four information dots $[I_1, I_2, I_3, I_4]$, $[I_5, I_6, I_7, I_8]$, $[I_9, I_{10}, I_{11}, I_{12}]$, $[I_{13}, I_{14}, I_{15}, I_{16}]$ are designed such that respectively independent data (3 bits×4=12 bits) is developed into information dots. In this manner, by disposing a sub-block, it is possible to easily carry out an error check which will be described later with a sub-block unit.

It is desirable that a vector direction (rotational direction) of the information dot 3 is determined uniformly with respect to each 30 degree-90 degree.

Figure 4:
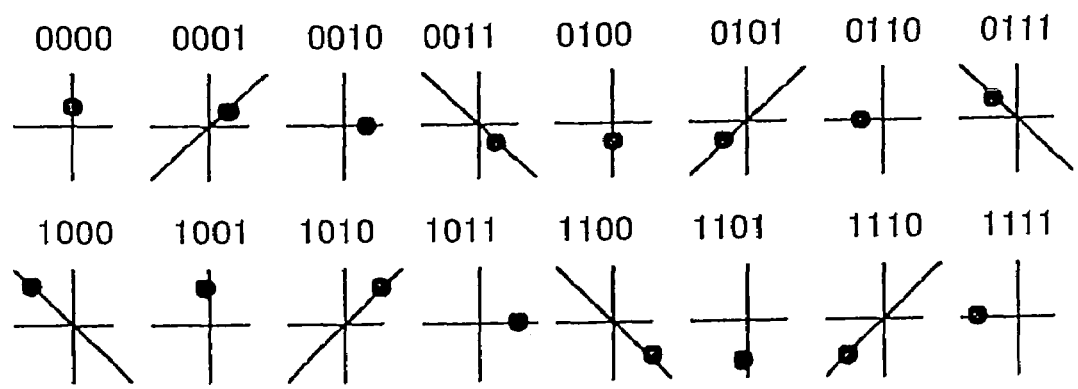
FIG. 4 is an example of the information dot and bit display of data which was defined therein, and one which shows another mode.

FIG. 4 is an example of the information dot and bit display of data which was defined therein, and is one which shows another mode.

Also, assuming that, as to the information dot 3, 2 types of long and short from the hypothetical point surrounded by the lattice dots 4 are used, and a vector direction is 8 directions, it is possible to represent 4 bits. At this time, it is desirable that a longer one is of 25-30% of a distance between adjacent hypothetical points, and a shorter one is of 15-20%. In this regard, however, it is desirable that an interval between centers of the information dots 3 of long and short becomes longer than a diameter of these dots.

It is desirable that the information dot 3 surrounded by the lattice dots 4 of 4 points is 1 dot, taking an appearance into consideration. However, in case that an amount of information is wanted to be increased, disregarding an appearance, by assigning 1 bit with respect to each 1 vector and representing the information dot 3 by a plurality of dots, a goodly amount of information can be possessed. For example, in a vector of concentric circle 8 directions, information of $2^8$ can be represented by the information dot 3 which was surrounded by the lattice dots 4 of 4 points, and $2^{128}$ is accomplished by 16 information dots in 1 block.

Figure 5:
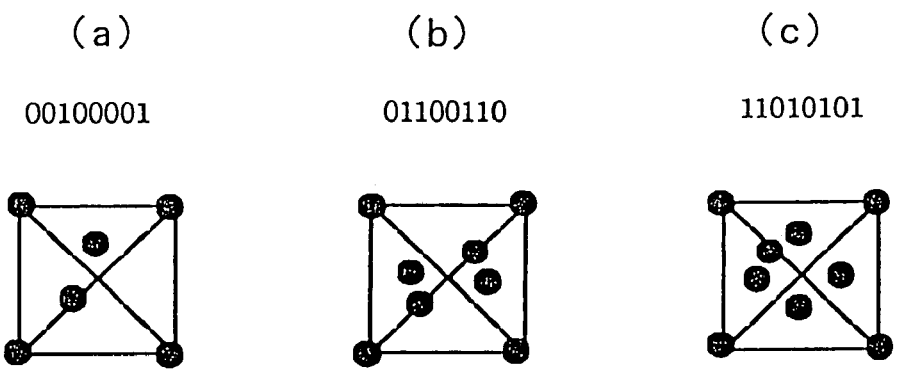
FIG. 5 is an example of the information dot and bit display of data which was defined therein, and (a) is one in which 2 dots were disposed, (b) is one in which 4 dots were disposed, and (c) is one in which 5 dots were disposed.

FIG. 5 is an example of the information dot and bit display of data which was defined therein, and (a) is one in which 2 dots were disposed, (b) is one in which 4 dots were disposed, and (c) is one in which 5 dots were disposed.

Figure 6:
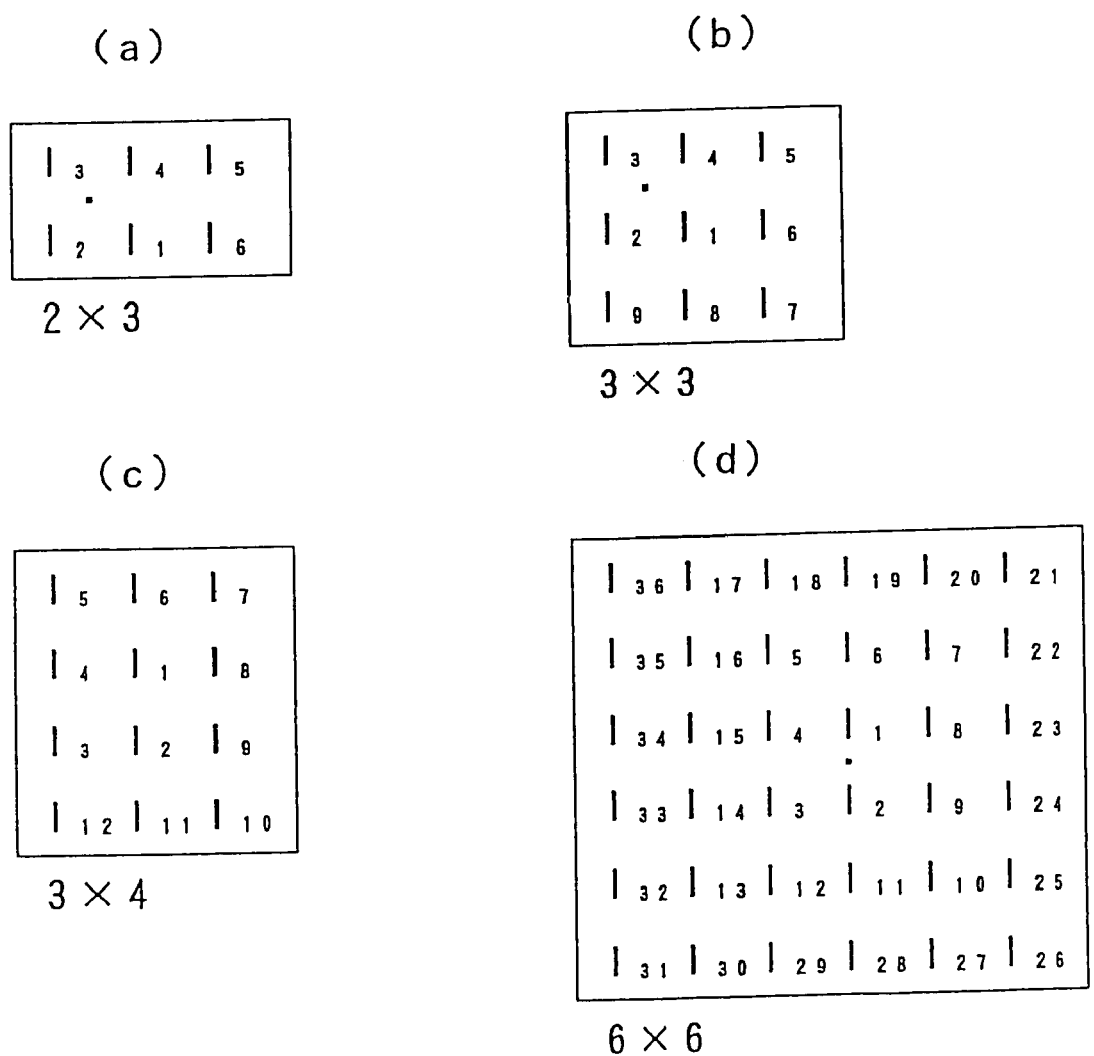
FIG. 6 is one which shows a modification example of the dot pattern, and (a) is a schematic diagram of 6 information dot arrangement type, (b) is a schematic diagram of 9 information dot arrangement type, (c) is a schematic diagram of 12 information dot arrangement type, and (d) is a schematic diagram of 36 information dot arrangement type.

FIG. 6 is one which shows a modification example of the dot pattern, and (a) is a schematic diagram of 6 information dot arrangement type, (b) is a schematic diagram of 9 information dot arrangement type, (c) is a schematic diagram of 12 information dot arrangement type, and (d) is a schematic diagram of 36 information dot arrangement type.

Figure 3:
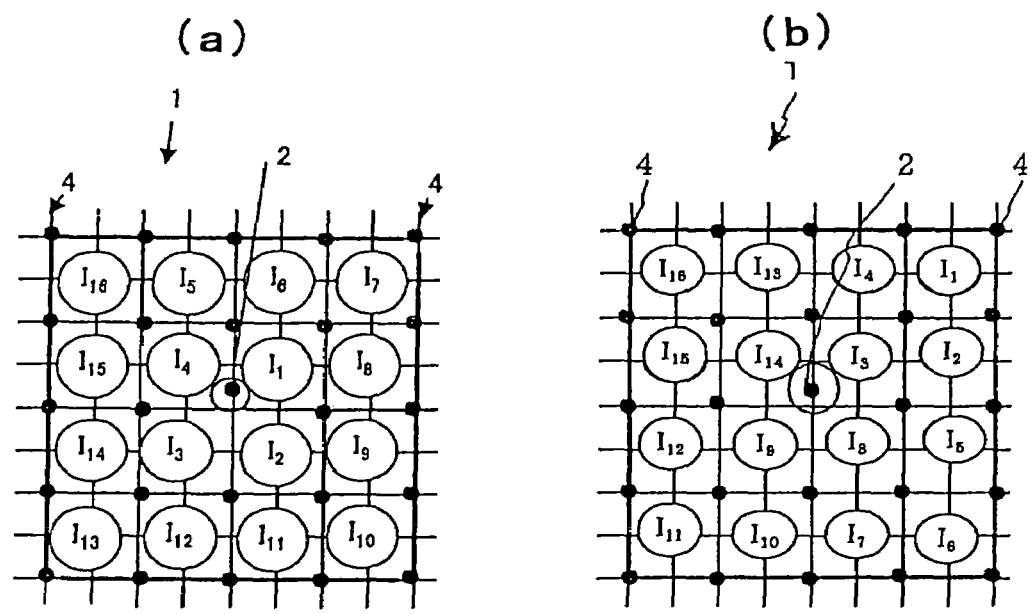
FIGS. 3(a), (b) are explanatory views which show information dots which were disposed around a key dot as a center.

The dot pattern 1 which is shown in FIG. 1 and FIG. 3 shows such an example that 16 (4×4) information dots 3 were disposed in 1 block. However, this information dot 3 is not limited to disposing 16 pieces in 1 block, and can be modified variously. For example, in accordance with large and small of a necessary amount of information and resolution of a camera, there is one (a) in which 6 pieces (2×3) of the information dots 3 were disposed in 1 block, one (b) in which 9 pieces (3×3) of the information dots 3 were disposed in 1 block, one (c) in which 12 pieces (3×4) of the information dots 3 were disposed in 1 block, or one (d) in which 36 pieces (6×6) of the information dots 3 were disposed in 1 block.

Figure 7:
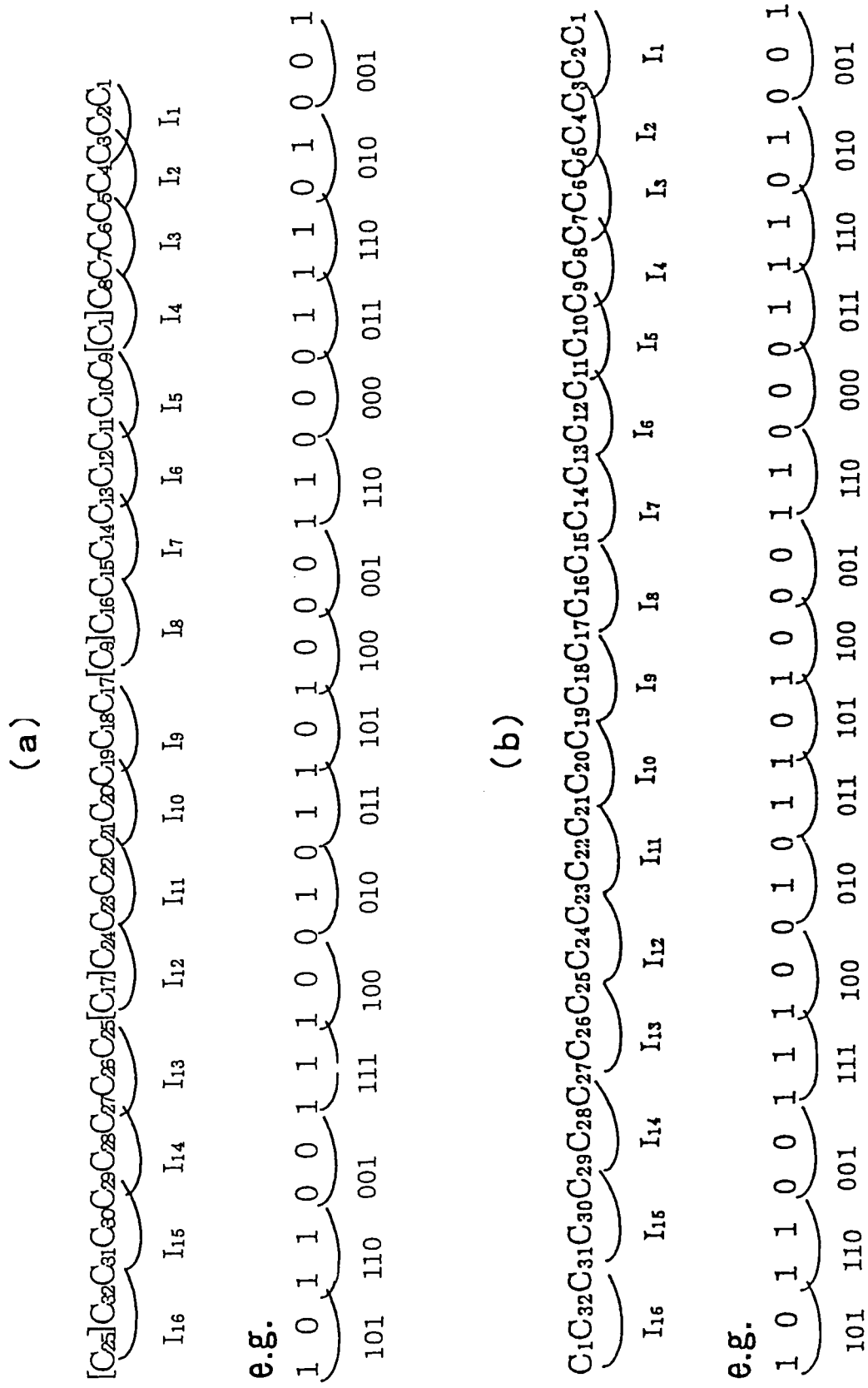
FIGS. 7(a), (b) are explanatory views which show such a state that information dots $I_1$ through $I_{16}$ were made to be arranged in a line in order to explain a method of checking an error of the information dot.

FIGS. 7(a), (b) are explanatory views which show such a state that information dots $I_1$ through $I_{16}$ were made to be arranged in a line in order to explain a method of checking an error of the information dot.

By giving redundancy to 1 bit, out of 3 bits of 1 piece of the information dots 3, and by treating a high bit of data which is obtained from the information dot $I_n$, and a low bit of data which is obtained from an information dot $I_{n+1}$ as identical, in such a state that the information dot 3 was displayed on a medium surface of a printed material etc., when a high bit of data which is obtained from its information dot $I_n$ and a low bit of data which is obtained from an information dot $I_{n+1}$ are not identical, it is judged that the information dot 3 is not displayed at an appropriate position.

Also, FIG. 7(b) is an explanatory view which shows such a state that information dots $I_1$ through $I_{16}$ were made to be arranged in a line in order to explain a method of checking an error of the information dot with a sub-block unit.

An error check system shown in FIG. 7(b) is a system for carrying out an error check of $[I_1, I_2, I_3, I_4]$, $[I_5, I_6, I_7, I_8]$, $[I_9, I_{10}, I_{11}, I_{12}]$, $[I_{13}, I_{14}, I_{15}, I_{16}]$ to be configured by 4 pieces of the information dots 3 with respectively independent data (3 bits×4=12 bits) unit.

By this, as to whether or not the information dot 3 of the dot pattern 1 is inputted by being shifted to such a position that an information dot 3 having adjacent, another data is disposed, due to shear in printing on a medium surface of a printed material etc., expansion and contraction of the medium surface, and deflection at the time of having conducted pixelation, its error can be checked by 100%.

Figure 8:
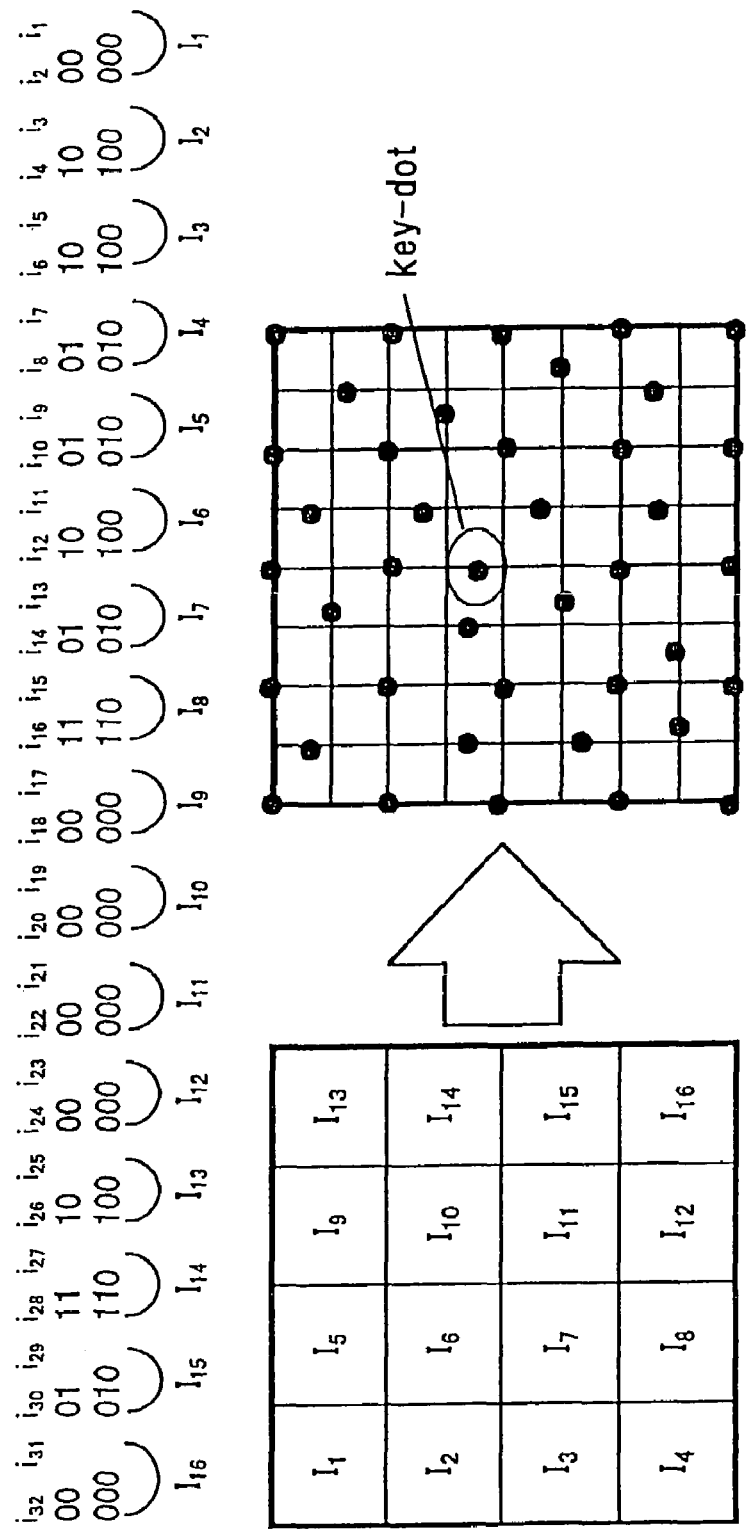
FIG. 8 is an explanatory view of a method of checking an error of the information dot by assigning "0" to a low bit.

FIG. 8 is an explanatory view of a method of checking an error of the information dot by assigning "0" to a low bit.

As to the information dot 3, by assigning "0" or "1" to its low bit, it can be used for an error check. In such a state that the information dot 3 was displayed on a medium surface, it is possible to judge that this information dot 3 is not displayed at an appropriate position, the information dot 3 to such a position that an information dot having adjacent another data is disposed around a hypothetical point as a center.

For example, assuming that a direction of the key dot 2 is defined as a upward direction, and data which is defined in the information dot 3 of that direction is "0", the information dot 3 is disposed in any one of the 8 directions, and "0" is assigned to a low bit in order to carry out an error check. That is, the information dot 3 to a low bit of which "0" was assigned is always disposed in up and down or left and right directions around the hypothetical point as a center. In this connection, when this information dot 3 is located in an inclined direction, it is possible to judge that it is not displayed at an appropriate position.

Figure 9:
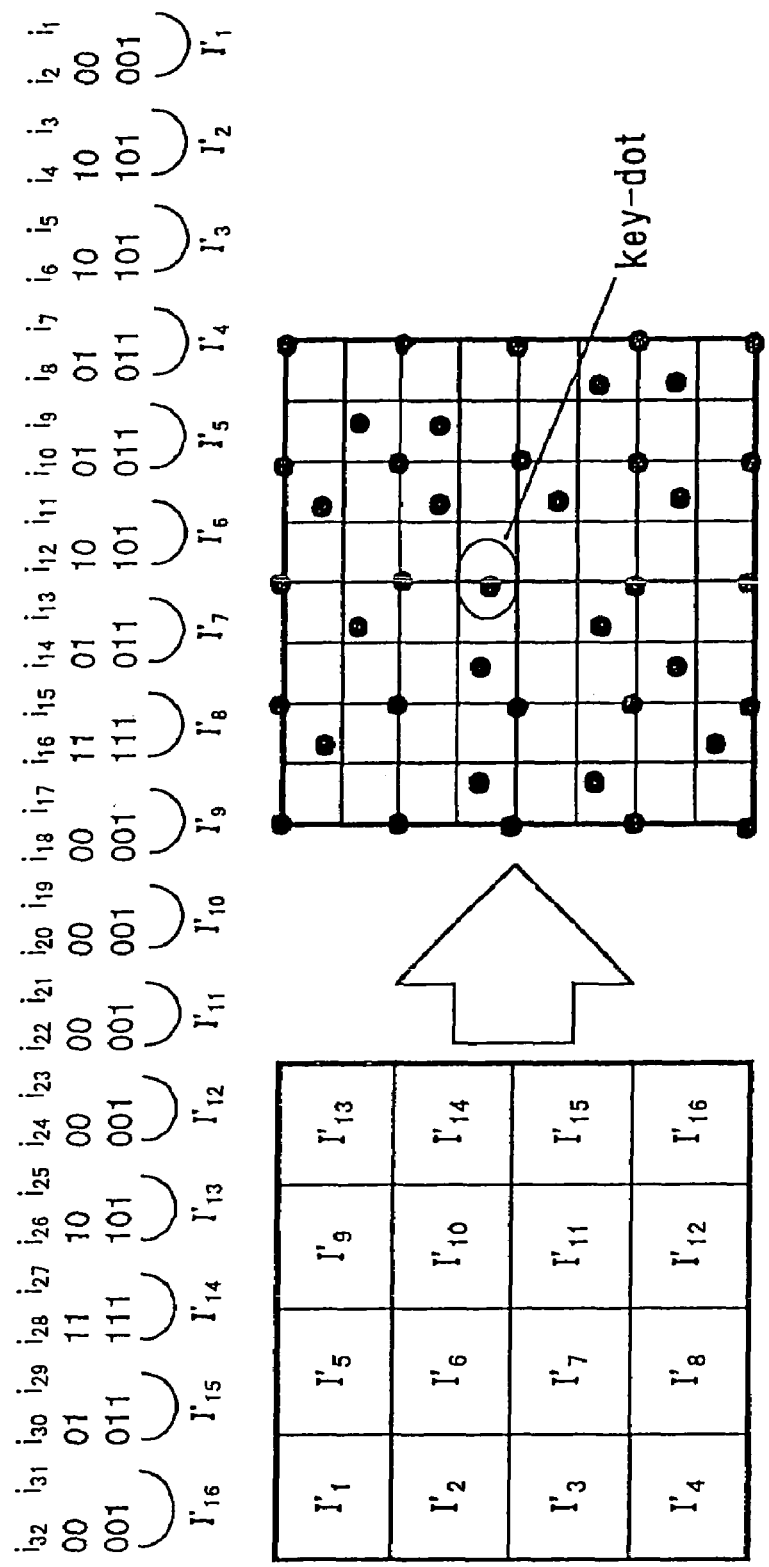
FIG. 9 is an explanatory view of a method of checking an error of the information dot by assigning "1" to the low bit.

FIG. 9 is an explanatory view of a method of checking an error of the information dot by assigning "1" to the low bit.

Or, assuming that a direction of the key dot 2 is defined as a upward direction, and data which is defined in the information dot 3 of that direction is "0", by disposing the information dot 3 in any one of the 8 directions, and assigning "1" to a low bit, it is also possible to carry out an error check. That is, the information dot 3 to a low bit of which "1" was assigned is always disposed in an inclined direction around the hypothetical point as a center. In this connection, when this information dot 3 is located in up and down or left and right directions, it is possible to judge that it is not displayed at an appropriate position.

Figure 10:
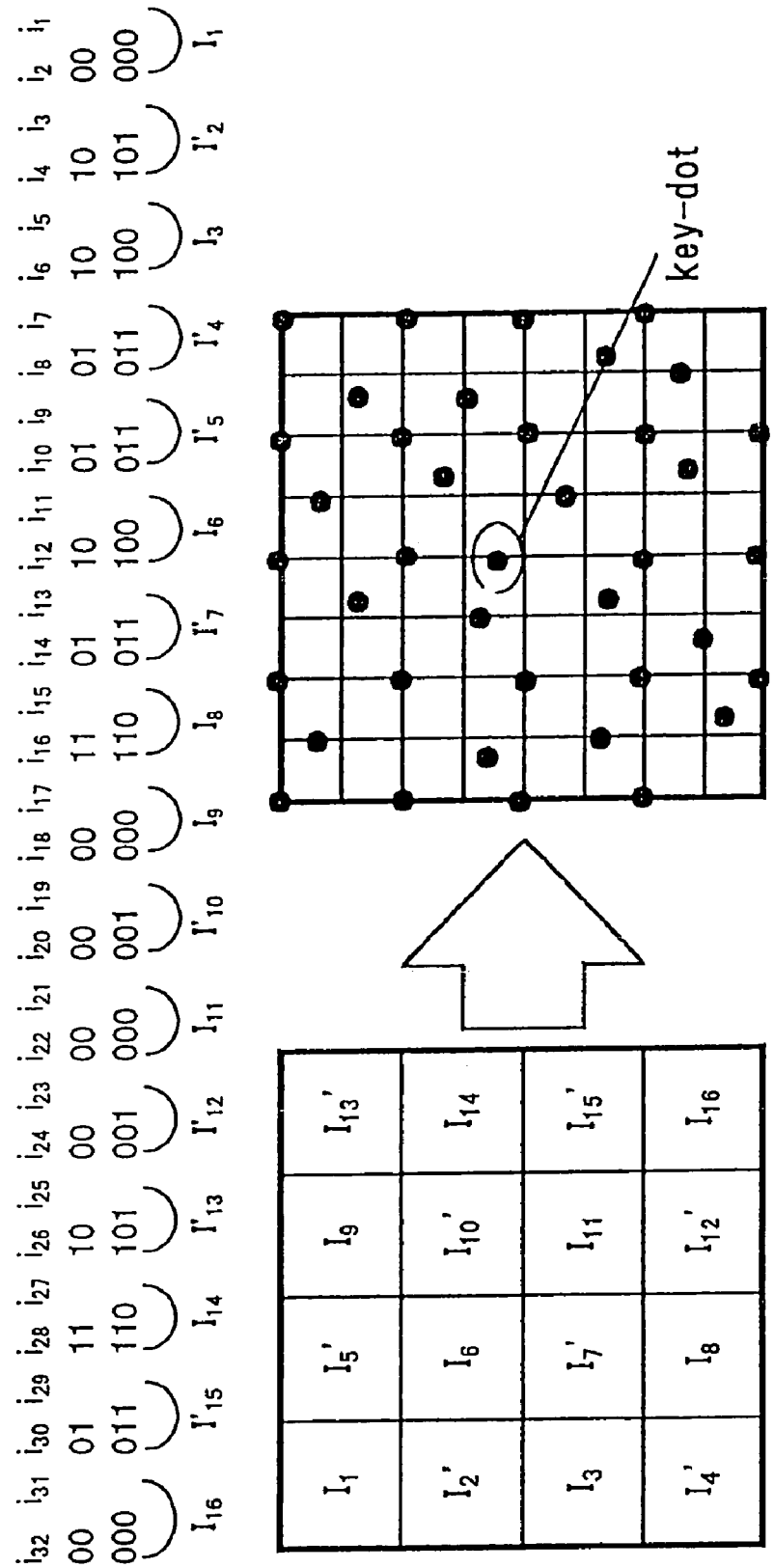
FIG. 10 is an explanatory view of a method of checking an error of the information dot by assigning "0" and "1" alternately to the low bit.

FIG. 10 is an explanatory view of a method of checking an error of the information dot by assigning "0" and "1" alternately to the low bit.

Furthermore, by disposing 1 piece of the information dot 3 all around and assigning "0" and "1" alternately to a low bit for use in an error check, it is also possible to check an error of this information dot 3. In this error check system, generated are information dots in up and down, left and right, and a 45 degree inclined directions alternately, and it becomes possible to eliminate regularity of a dot pattern. That is, the information dot 3 to a low bit of which, "0" and "1" were assigned alternately is always located in up and down, left and right, or a 45 degree inclined direction around the hypothetical point as a center. In this connection, when this information dot 3 is located in a direction other than up and down, left and right or 45 degree inclined direction, it is judged that it is not displayed at an appropriate position. In this manner, it is possible to surely check such an error that the information dot 3 was inputted by being shifted to a rotational direction around the hypothetical point as a center.

In addition, the information dots 3 were made to be the 8 directions (interval of 45 degree) and long and short (see, FIG. 4), assuming that a low 1 bit, out of 4 bits is "0" or "1", in case of having been shifted to position of dots of adjacent 3 points (concentric circle±2 points of 45 degree rotational positions+any 1 point of long and short), that can be made as an error, and it is possible to check an error by 100%.

FIG. 11 is an explanatory view which shows such a state that the information dots $I_1$ through $I_{16}$ were arranged in a line in order to explain about security of the information dot.

For example, in order to make it impossible to visually read data of the dot pattern 1, carried out an arithmetic operation which was represented by a function $f(K_n)$ to $I_n$ of the information dot 3, and $I_n = K_n + R_n$ is represented by the dot pattern 1, and after the dot pattern $I_n$ was inputted, $K_n = I_n - R_n$ is obtained.

Or, in order to make it impossible to visually read data of the dot pattern 1, a plurality of information dots 3 are arranged in an I line with the key dot 2 as a representative point, and this I line is arranged in a plurality of lines, and a difference of data of adjacent 2 lines is made to be data of the information dot 3, and thereby, it is possible to dispose each information dot 3, in such a manner that regularity of the dot pattern 1 of each block is eliminated.

By this, since it becomes impossible to visually read the dot pattern 1 which was printed on a medium surface, it is possible to heighten security. Also, on the occasion of having printed the dot pattern 1 on a medium surface, the information dot 3 is disposed randomly, and a pattern disappears, and it is possible to obscure the dot pattern.

Figure 12:
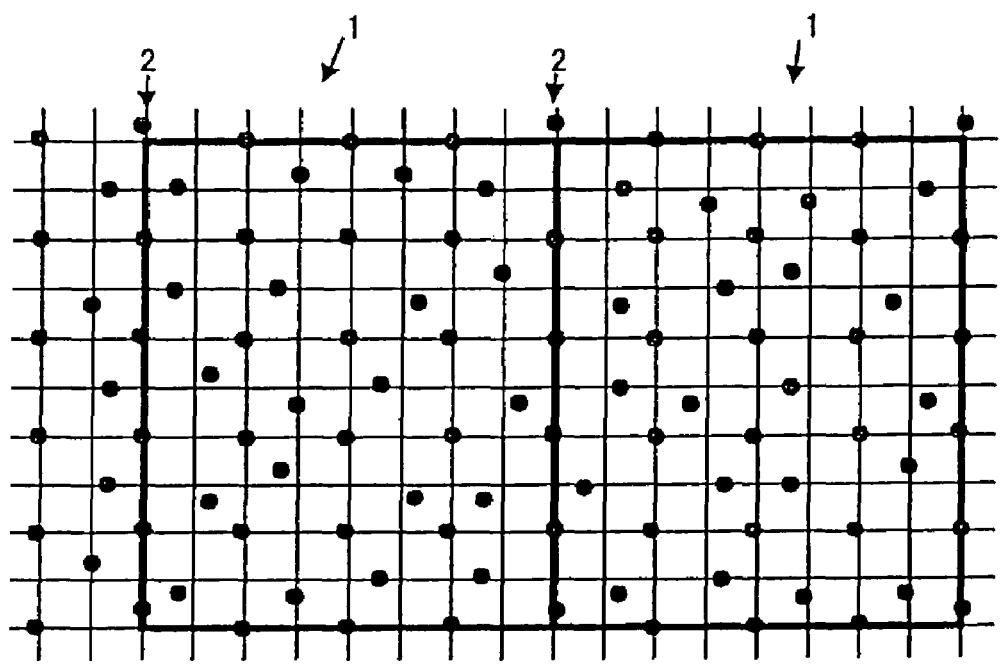
FIG. 12 is a front view which shows another example of arrangement of the dot pattern in which an arrangement position of the key dot was changed.

FIG. 12 is an explanatory view which shows another example of arrangement of the dot pattern in which an arrangement position of the key dot was changed.

There is no necessity that the key dot 2 is necessarily disposed at a center of a block of the lattice dots 4 which were disposed in a rectangular shape. For example, it is possible to dispose it at a corner part of a block of the lattice dots 4. At this time, it is desirable that the information dots 3 are disposed in such a manner that they stand in a line from the key dot 2 as a start point.

Figure 13:
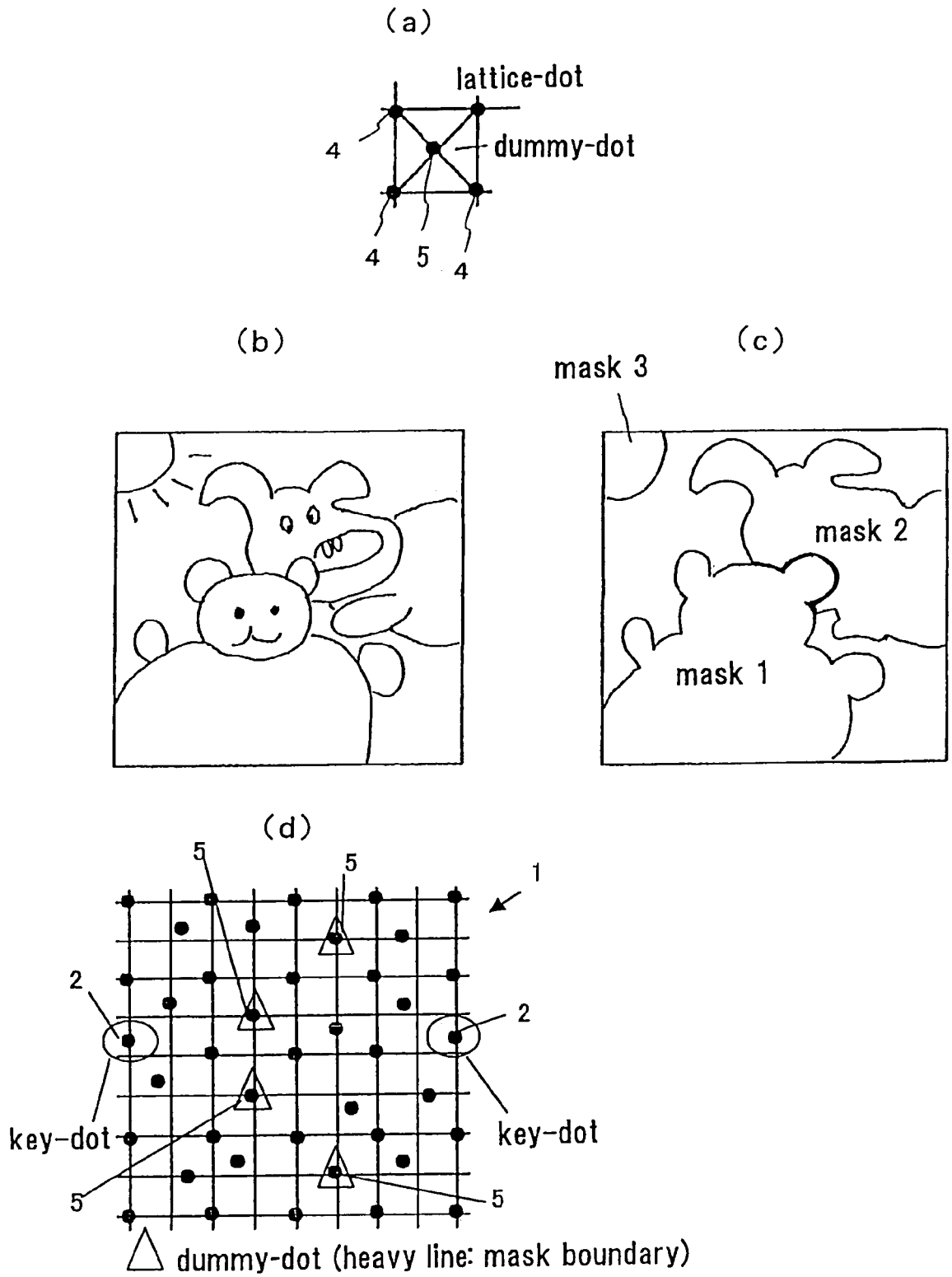
FIG. 13 is one which shows a dummy dot, and (a) is an explanatory view of the dummy dot, and (b) is an explanatory view which shows one example of a printed material, (c) is an explanatory view which shows a region in the printed material, and (d) is an explanatory view which shows an arrangement example of the dot pattern in which a border of a mask is controlled by the dummy dot.

FIG. 13 is one which shows a dummy dot, and (a) is an explanatory view of the dummy dot, and (b) is an explanatory view which shows one example of a printed material, (c) is an explanatory view which shows a region in the printed material, and (d) is an explanatory view which shows an arrangement example of the dot pattern in which a border of a mask is controlled by the dummy dot.

A dot is disposed at a central position of the lattice dots 4 of 4 points, and a dummy dot 5 is defined as a dot to which information is not given (FIG. 13(a)). This dummy dot 5 can be used for a border of a region and a region where numerical value data, or X, Y coordinate values were defined, or a region where numerical value data, or X, Y coordinate values are not defined.

For example, as shown in FIG. 13(b), 3 kinds of designs such as a little bear, a hippopotamus and a sun are printed, and regions which corresponded to these three designs are disposed, as shown in FIG. 13(c), like a mask 1, a mask 2, a mask 3. As shown in FIG. 13(d), the dummy dot 5 is disposed at a border of the mask 1 and the mask 2.

In addition, in case of using the dummy dot 5 at a border, there is no necessity to make all blocks at a corresponding position the dummy dots 5, and a minimum dot for showing a border may be made as a dummy dot.

Also, the dummy dot is disposed at a region other than the mask, and it is possible to dispose a region where information is not defined.

When the dot pattern 1 is imported as image data by a camera, after calculated was X, Y coordinate values at a position of the key dot 2 which is a representative point of information, by supplementing a coordinate value, by a direction of the dot pattern 1 which is obtained from the key dot 2, increment values of X, Y coordinate values at an adjacent representative point, and a distance from an image pickup center to the key dot 2 whose X, Y coordinate values were calculated, X, Y coordinate values of the image pickup center are calculated.

Also, when a block of the dot pattern 1 is imported as image data by a camera, in a region where identical data is defined in each block, or a region where X, Y coordinate values are defined, reading is started from an information dot 3 which is located at a circumference of the image pickup center of the camera, and information dots 3 are read sequentially, and information dots 3 which correspond to 1 block portion are read, and thereby, the dot pattern 1 is read a minimum area from the image pickup center of the camera, and data at the image pickup center position is calculated.

Figure 14:
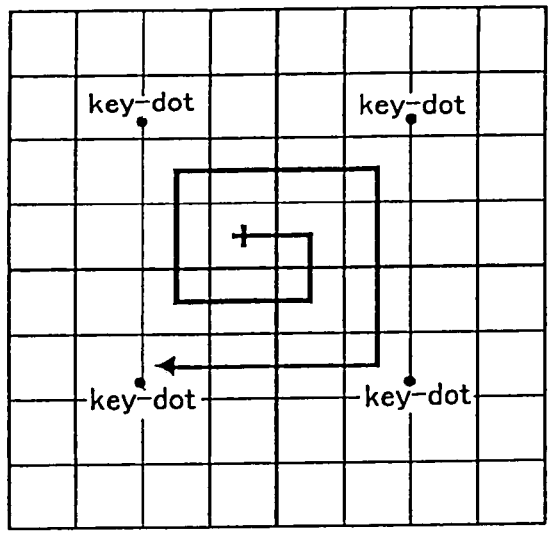
FIG. 14(a) is an explanatory view which shows an order of inputting information dots.
FIG. 14(b) is an explanatory view which shows a method of reading the dot pattern and calculating X, Y coordinate values.
Figure 17:
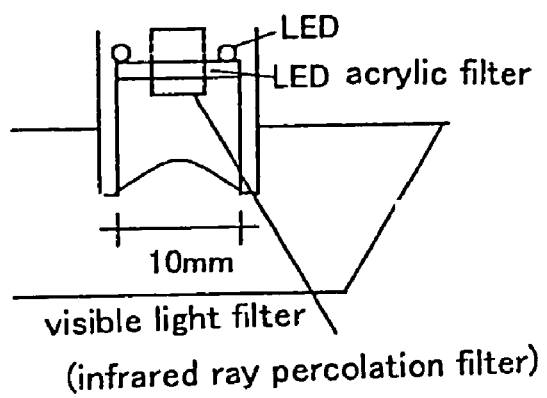
FIG. 17 is a sectional view of a camera.
Figure 18:
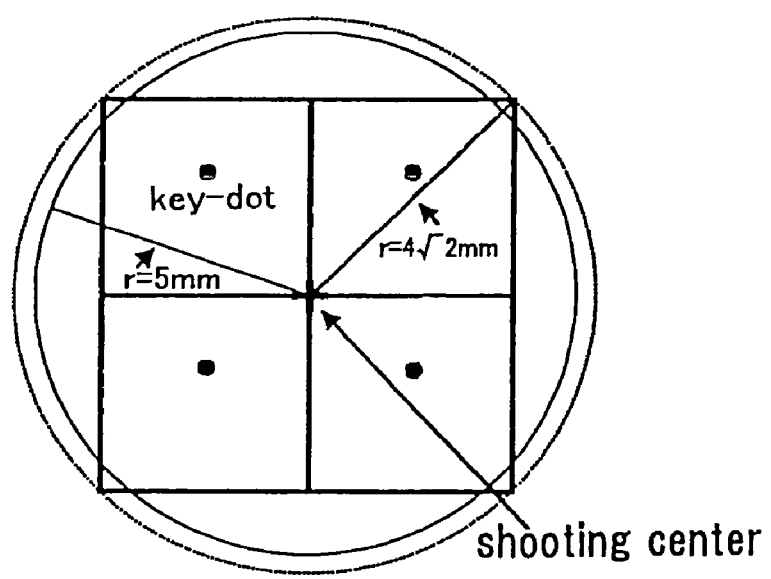
FIG. 18 is an explanatory view which shows a scope of image pickup of a camera.

FIG. 14(a) is one which shows an order of inputting information dots which correspond to 1 block portion in a minimum area from an image pickup center of a camera. Information dots of lengthwise 4 pieces×4 lines=16 pieces in a clockwise direction.

FIG. 14(b) is an explanatory view which shows a method of reading the dot pattern and calculating X, Y coordinate values.

As shown in the figure, X, Y coordinate values to be calculated are set as X, Y coordinate values of a block which is located at an image pickup center of a camera. The X, Y coordinate values has such a necessity that, when an increment value is decided to be +1 in a X direction (right direction) and a Y direction (up direction) with respect to each block, an information dot which was inputted from another block are amended. In addition, $K_8K_7K_6K_5$ ($i_{16}i_{15}i_{14}i_{13}i_{12}i_{11}i_{10}i_9$) which shows a X coordinate value and $K_4K_3K_2K_1$ ($i_8i_7i_6i_5i_4i_3i_2i_1$) which shows a Y coordinate value become objects to be amended, and $K_{16}$-$K_9$($i_{32}$-$i_{17}$) other than this becomes an identical value in any block, and there is no necessity to be amended.

These calculations are obtained by the following mathematical formulas. Even if there is a carry by a calculation in [ ], it is assumed that it does not influence a line of bits before [ ]. One that, from an information dot I, an error check bit is excluded, is set as K.

Mathematical Formula 1

(1) In case that $_{11}I_{11}$, is a start point (Image pickup Center of Camera)

$X$ coordinate $=_{11}K_8*_{11}K_7*_{11}K_6*_{21}K_5$ $Y$ coordinate $=_{12}K_4*_{12}K_3*_{12}K_2*[_{22}K_1+1]$ (2) In case that $_{11}I_{15}$ is a start point (Image pickup Center of Camera)

$X$ coordinate $=_{12}K_8*_{12}K_7*_{12}K_6*_{21}K_5-1$ $Y$ coordinate $=_{12}K_4*_{12}K_3*_{12}K2*[_{22}K_1+1]$ (3) In case that $_{12}I_3$ is a start point (Image pickup Center of Camera)

$X$ coordinate $=_{12}K_8*_{12}K_7*_{12}K_6*_{22}K_5$ $Y$ coordinate $=_{12}K_4*_{12}K_3*_{12}K_2*[_{22}K_1+1]$ (4) In case that $_{12}I_7$ is a start point (Image pickup Center of Camera)

$X$ coordinate $=_{12}K_8*_{12}K_7*_{12}K_6*_{22}K_5$ $Y$ coordinate $=_{12}K_4*_{12}K_3*_{12}K_2*[_{22}K_1+1]$ (5) In case that $_{11}I_{12}$ is a start point (Image pickup Center of Camera)

$X$ coordinate $=_{11}K_8*_{11}K_7*_{21}K_6*_{21}K_5$ $Y$ coordinate $=_{12}K_4*_{12}K_3*[_{22}K_2*_{22}K_1+1]$ (6) In case that $_{11}I_{16}$ is a start point (Image pickup Center of Camera)

$X$ coordinate $=_{12}K_8*_{12}K_7*_{22}K_6*_{22}K_5-1$ $Y$ coordinate $=_{12}K_4*_{12}K_3*[_{22}K_2*_{22}K_1+1]$ (7) In case that $_{12}I_4$ is a start point (Image pickup Center of Camera)

$X$ coordinate $=_{12}K_8*_{12}K_7*_{22}K_6*_{22}K_5$ $Y$ coordinate $=_{12}K_4*_{12}K_3*[_{22}K_2*_{22}K_1+1]$ (8) In case that $_{12}I_8$ is a start point (Image pickup Center of Camera)

$X$ coordinate $=_{12}K_8*_{12}K_7*_{22}K_6*_{22}K_5$ $Y$ coordinate $=_{12}K_4*_{12}K_3*[_{22}K_2*_{22}K_1+1]$ (9) In case that $_{21}I_{13}$ is a start point (Image pickup Center of Camera)

$X$ coordinate $=_{11}K_8*_{21}K_7*_{21}K_6*_{21}K_5$ $Y$ coordinate $=_{12}K_4*[_{22}K_3*_{22}K_2*_{22}K_1+1]-1$

(10) In case that $_{21}I_{13}$ is a start point (Image pickup Center of Camera)

$X$ coordinate $=_{12}K_8*_{22}K_7*_{22}K_6*_{22}K_5-1$ $Y$ coordinate $=_{12}K_4*[_{22}K_3*_{22}K_2*_{22}K_1+1]-1$

(11) In case that $_{22}I_1$ is a start point (Image pickup Center of Camera)

$X$ coordinate $=_{12}K_8*_{22}K_7*_{22}K_6*_{22}K_5$ $Y$ coordinate $=_{12}K_4*[_{22}K_3*_{22}K_2*_{22}K_1+1]-1$

(12) In case that $_{22}I_5$ is a start point (Image pickup Center of Camera)

$X$ coordinate $=_{12}K_8*_{22}K_7*_{22}K_6*_{22}K_5$ $Y$ coordinate $=_{12}K_4*[_{22}K_3*_{22}K_2*_{22}K_1+1]-1$

(13) In case that $_{22}I_{10}$ is a start point (Image pickup Center of Camera)

$X$ coordinate $=_{21}K_8*_{21}K_7*_{21}K_6*_{21}K_5$ $Y$ coordinate $=_{22}K_4*_{22}K_3*_{22}K_2*_{22}K_2$

(14) In case that $_{21}I_{14}$ is a start point (Image pickup Center of Camera)

$X$ coordinate $=_{22}K_8*_{22}K_7*_{22}K_6*_{22}K_5-1$ $Y$ coordinate $=_{22}K_4*_{22}K_3*_{22}K_2*_{22}K_1$

(15) In case that $_{22}I_2$ is a start point (Image pickup Center of Camera)

$X$ coordinate $=_{22}K_8*_{22}K_7*_{22}K_6*_{22}K_5$ $Y$ coordinate $=_{22}K_4*_{22}K_3*_{22}K_2*_{22}K_1$

(16) In case that $_{22}I_6$ is a start point (Image pickup Center of Camera)

$X$ coordinate $=_{22}K_8*_{22}K_7*_{22}K_6*_{22}K_5$ $Y$ coordinate $=_{22}K_4*_{22}K_3*_{22}K_2*_{22}K_1$ When the dot pattern 1 is imported as image data by a camera, on the occasion that an error occurred as to the information dot 3, an information dot 3 which corresponds to the information dot 3 and which is the closest is read, and error correction is carried out, and thereby, it is possible to read out the dot pattern 1 by a minimum area from an image pickup center of a camera.

By utilizing the above-described importing method of information, it is possible to realize a tablet and a digitizer, an input interface, which used XY coordinates. For example, a tablet and a digitizer overlap a transparent sheet on which the dot pattern 1 was printed with an object, carry out camera image pickup, and input XY coordinate values of the dot pattern 1.

Figure 16:
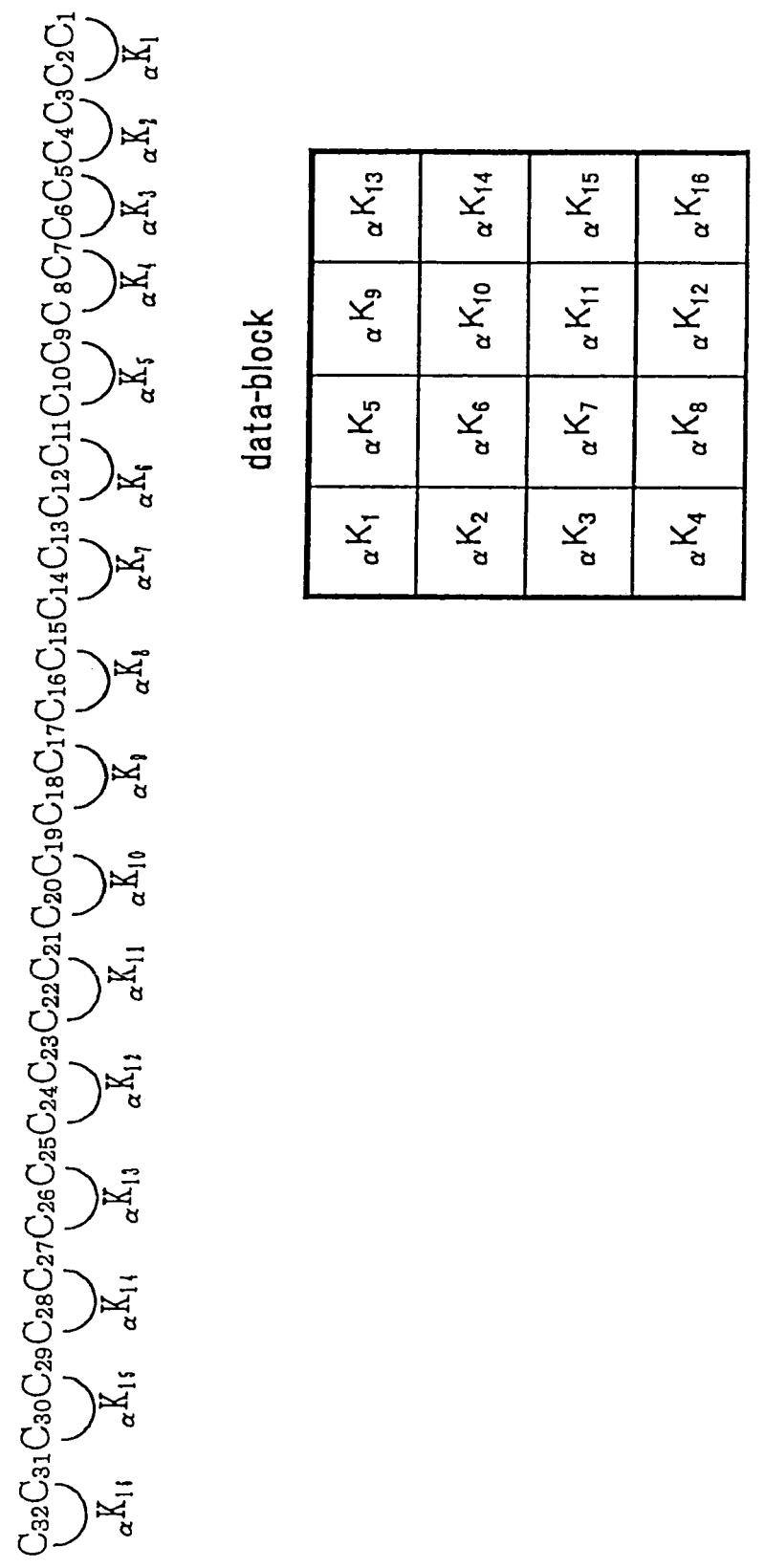

FIG. 15 is an explanatory view which shows a dot pattern generating method with removed regularity, and one which shows an information block which is used as a dot pattern. FIG. 16 is one which shows a dot pattern generating method with removed regularity, and an explanatory view which shows a data block to be recorded in the dot pattern.

Firstly, as shown in FIG. 15, $i_n$, means data of 1 bit, and $r_m$ is assumed to be $i_{2m} \times 2 + i_{2m-1}$. Also, an error check bit is added as $_\alpha i_m = _\alpha r_m \times 2+$, $_\alpha I'_m = _\alpha r_m \times 2+1$. $\alpha$ is assumed to be a numerical value which shows a line of blocks in a lateral direction.

Next, as shown in FIG. 16, $C_n$ is assumed to be data of 1 bit which is desired to be recorded.

Also, $_\alpha K_m$ is assumed to be $C_{2m} \times 2 + C_{2m-1}$. $\alpha$ becomes a numerical value which shows a line of blocks in a lateral direction.

By use of $_\alpha r_m$ which is obtained from $_\alpha K_m$ by use of the following mathematical formula 2, by the above-described definitions, an information block 3 which is used as the dot pattern 1 is generated 4. By this, the dot pattern 1 can exclude regularity to a lateral direction.

<Mathematical Formula 2>

$$_\alpha r_1 = _{\alpha-1} r_{13} + _\alpha K_1 \; _\alpha r_5 = _\alpha r_1 + _\alpha K_5 \; _\alpha r_9 = _\alpha r_5 + _\alpha K_9 \; _\alpha r_{13} = _\alpha r_9 + _\alpha K_{-}$$

$$_\alpha r_2 = _{\alpha-1} r_{14} + _\alpha K_2 \; _\alpha r_6 = _\alpha r_2 + _\alpha K_6 \; _\alpha r_{10} = _\alpha r_6 + _\alpha K_{10} \; _\alpha r_{14} = _\alpha r_{10} + _\alpha K_{14}$$

$$_\alpha r_3 = _{\alpha-1} r_{15} + _\alpha K_3 \; _\alpha r_7 = _\alpha r_3 + _\alpha K_7 \; _\alpha r_{11} = _\alpha r_7 + _\alpha K_{11} \; _\alpha r_{15} = _\alpha r_{11} + _\alpha K_{15}$$

$$_\alpha r_4 = _{\alpha-1} r_{16} + _\alpha K_4 \; _\alpha r_8 = _\alpha r_4 + _\alpha K_8 \; _\alpha r_{12} = _\alpha r_8 + _\alpha K_{12} \; _\alpha r_{16} = _\alpha r_{12} + _\alpha K_{16}$$

When $\alpha=1$, an initial value is given as $_0 r_{13}, _0 r_{14}, _0 r_{15}, _0 r_{16}$. This is assumed to be $_\beta R$. $\beta$ is assumed to be a numerical value which shows a line of blocks in a vertical direction. $_\beta R$ is not an identical value, and by imparting a value due to random number sequence, the dot pattern exclude regularity even to a vertical direction.

FIG. 17 through FIG. 23 are explanatory views which show a method of reading a dot pattern which corresponds to 1 block configured by sub-blocks by a camera.

A tube for containing a camera is in the vicinity of 10 mm, and, assuming that a scope of image pickup of a dot pattern is 10 mm in diameter, in order to read 1 block portion ($I_1$-$I_{16}$) of a dot pattern of 4 mm×4 mm, required is a scope of image pickup of $2r = 2 \times 4\sqrt{2} = 11.28$ mm. In order to eliminate this, 16 pieces of information dots which are disposed at a circumference of a key dot which is configured as 1 block are not read sequentially, but read with respect to each 4 information dots (¼ block) having another information and independent information. By this, by inputting corresponding information dots of another block (¼ block), which exists in a scope of image pickup of information dots of ¼ block, outside of a scope of image pickup, it enables inputting information of 1 block portion within 10 mm in diameter of a scope of image pickup.

In case that there occurred an error in any ¼ block which was inputted by the above-described method, corresponding information dots (¼ block) of another block are inputted, and error correction is carried out.

Figure 20:
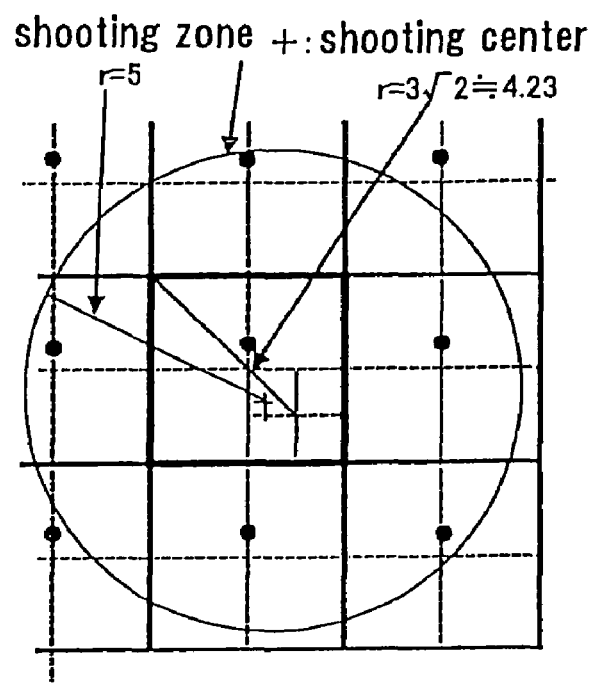
FIG. 20 is an explanatory view which shows a procedure of inputting an image pickup center position and sub-blocks by a camera.

In FIG. 20, an image pickup center of a camera shows $I_8$ of a B1 block, and inputted are [$I_1$-$I_{16}$] of the B1 block which is the closest from the image pickup center.

Figure 21:
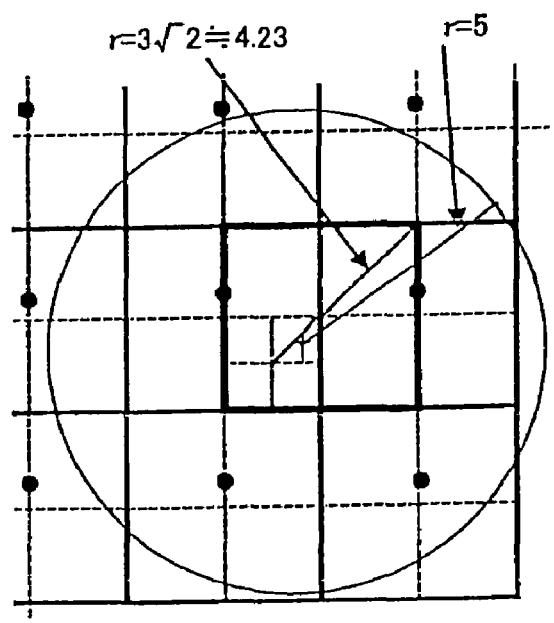
FIG. 21 is an explanatory view which shows a procedure of inputting the image pickup center position and the sub-blocks by a camera.

In FIG. 21, an image pickup center of a camera shows $I_5$ of the B1 block, and inputted are [$I_1, I_2, I_3, I_4$], [$I_5, I_6, I_7, I_8$] of the B1 block which is the closest from the center, and [$I_9, I_{10}, I_{11}, I_{12}$], [$I_{13}, I_{14}, I_{15}, I_{16}$] of a B2 block.

Figure 22:
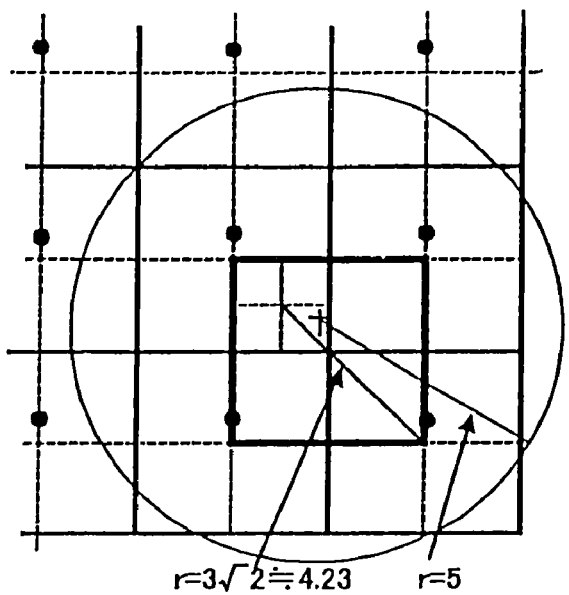
FIG. 22 is an explanatory view which shows a procedure of inputting the image pickup center position and the sub-blocks by a camera.

In FIG. 22, an image pickup center of a camera shows $I_6$ of the B1 block, and inputted are [$I_5, I_6, I_7, I_8$] of the B1 block which is the closest from the center, [$I_9, I_{10}, I_{11}, I_{12}$] of a B2 block, [$I_{13}, I_{14}, I_{15}, I_{16}$] of a B3 block, and [$I_1, I_2, I_3, I_4$] of a B4 block.

Figure 23:
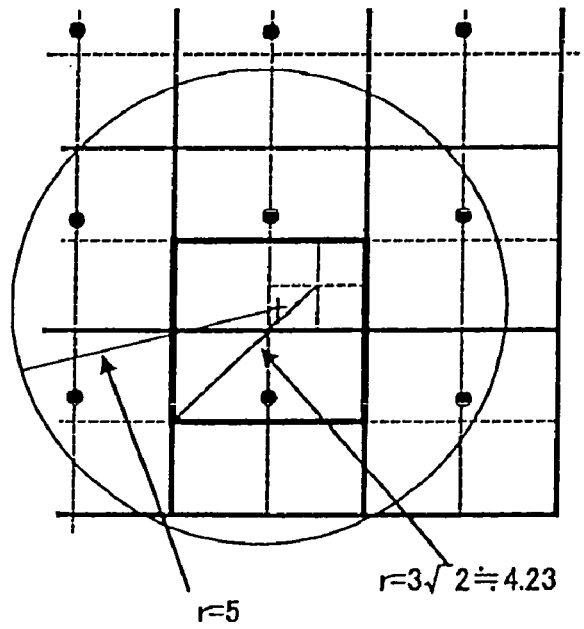
FIG. 23 is an explanatory view which shows a procedure of inputting the image pickup center position and the sub-blocks by a camera.

In FIG. 23, an image pickup center of a camera shows $I_7$ of the B1 block, and inputted are [$I_5, I_6, I_7, I_8$], [$I_9, I_{10}, I_{11}, I_{12}$] of the B1 block which is the closest from the center, and [$I_1, I_2, I_3, I_4$], [$I_{13}, I_{14}, I_{15}, I_{16}$] of the B4 block.

In FIG. 20-FIG. 23, in case that an error occurred in the dot pattern which was inputted, there are dot patterns of the ¼ block which can be inputted as an alternative at 8 places at the maximum.

The dot pattern 1 of this invention as described above is printed on a printed material such as a picture book, a text etc., and thereby, is imported by this camera as image data, and by a numerical value which was obtained by digitizing it, outputted are information, a program corresponding to that, from a personal computer, an information output device, a PDA or a portable telephone etc.

In addition, this invention is not limited to the above-described mode for carrying out this invention, and if it is one in which, by imparting different functions to respective dots 2, 3, 4 of the dot pattern 1, a goodly amount of data is defined by a dot pattern, and informatized expeditiously recognizing directionality, and thereby, predetermined information and program are made to be outputted and various usage become possible, as a matter of course, it can be modified variously within a scope which is not deviated from a substance of this invention.

INDUSTRIAL APPLICABILITY

As described above, an information input and output method by use of a dot pattern of this invention recognizes a dot pattern, firstly, a lattice dot by a camera and extracts a key dot, and recognizes directionality by the key dot, and can use its direction as a parameter. Next, by extracting an information dot which was disposed at a circumference of this key dot, it is possible to have information and program outputted expeditiously.

Also, since a lattice dot is disposed in the dot pattern, on the occasion of importing this dot pattern as image data by a camera, it is possible to correct distortion of the imaged dot pattern due to distortion of a lens, cross shot, expansion and contraction of a page space, curvature of a medium surface, and deflection at the time of printing.

Furthermore, it is possible to check an error of a layout state of dots, and furthermore, it is possible to heighten security.

The invention claimed is:

1. An information input and output method by use of a dot pattern characterized in that,
    on a medium surface of a printed material, a plurality of lattice dots (4) are disposed in a rectangular shape and set as a block, and
    the block is regularly and continuously disposed, and
    a dot that forms one of the lattice dots (4) which exists in the block is disposed by being shifted unidirectionally and is set as a key dot (2), and
    a plurality of information dots (3) having various information are disposed by setting said key dot (2) as a representative point, wherein each of the plurality of information dots (3) is disposed at an end point of a vector, wherein a start point of the vector is set at a center surrounded by the lattice dots (4) of four points and wherein the plurality of information dots (3) are arranged in accordance with a predetermined rule by a dot code generation algorithm to thereby generate a dot pattern (1), and the block which configures said dot pattern (1) is imported as image data by a camera and, from a numerical value which was calculated by digitizing the image data, information and a program are outputted.

2. An information input and output method by use of a dot pattern of claim 1, characterized in that, by said camera, recognized is a direction of the key dot (2) of said dot pattern (1), and on the basis of that direction, a dot which was disposed at the end point is set as the information dot (3).

3. An information input and output method by use of a dot pattern of claim 1, characterized in that a plurality of said information dots (3) are displayed around a hypothetical point of said lattice dot (4) as a center.

4. An information input and output method by use of a dot pattern of claim 1, characterized in that,
in case that data which is defined in said information dot (3) was bit-displayed, for use in an error check, by giving redundancy to one bit, out of one piece of said information dots (3), and by treating a high bit of data which is obtained from an information dot (In) and a low bit of data which is obtained from an information dot (In+1) as identical,
in such a state that said information dot (3) was displayed on said medium surface, when a high bit of data which is obtained from the information dot (In) and a low bit of data which is obtained from an information dot (In+1) are not identical, it is judged that said information dot (3) is not displayed at an appropriate position.

5. An information input and output method by use of a dot pattern of claim 1, characterized in that,
by assigning "0" or "1" to a low bit, in such a state that the information dot (3) was displayed on the medium surface, when there is misalignment from a position where the information dot (3) is disposed, to a position where disposed is an information dot (3) which is adjacent and has another data, it is judged that the information dot (3) is not displayed at an appropriate position.

6. An information input and output method by use of a dot pattern of claim 5, characterized in that,
assuming that a direction of said key dot (2) is defined as a upward direction, and data which is defined in an information dot (3) of that direction is "0", by disposing said information dot (3) in any one of equally spaced 8 directions, and assigning "0" to a low bit in order to carry out an error check,
in such a state that said information dot (3) was displayed on said medium surface, when the information dot (3) is located in an inclined direction other than up and down or left and right directions around the hypothetical point as a center, it is judged that the information dot (3) is not displayed at an appropriate position.

7. An information input and output method by use of a dot pattern of claim 5, characterized in that,
assuming that a direction of said key dot (2) is defined as a upward direction, and data which is defined in an information dot (3) of that direction is "0", by disposing the information dot (3) in any one of equally spaced 8 directions, and assigning "1" to a low bit in order to carry out an error check,
in such a state that said information dot (3) was displayed on said medium surface, when the information dot (3) is located in up and down or left and right directions other than an inclined direction around the hypothetical point as a center, it is judged that the information dot (3) is not displayed at an appropriate position.

8. An information input and output method by use of a dot pattern of claim 5, characterized in that,
in order to carry out an error check of said information dot (3) and to dispose the information dots (3) all around, assigned are "0" and "1" to a low bit alternately.

9. An information input and output method by use of a dot pattern of claim 1, characterized in that,
in order to encrypt data $(K_n)$ which was defined in the information dot $(I_n)$ of said dot pattern (1) so as to make it impossible to be read visually,
performed is an arithmetic operation which was represented by the function (f) to the data $(K_n)$, and
$I_n=f(K_n)$ is represented by the dot pattern (1), and
said dot pattern (1) is imported as image data by a camera, and said data $(K_n)$ is calculated by $K_n=f^{-1}(I_n)$.

10. An information input and output method by use of a dot pattern of claim 1, characterized in that,
in order to eliminate regularity of said dot pattern (1) so as to make it impossible to visually read data of said information dot (3),
a difference component of adjacent two lines of information dots (3) is set as data which is defined in the information dot (3), and
by the information dot $(I_n)$ which is calculated by adding the defined data $(K_n)$ to a front line information dot $(I_n)$ among the adjacent ones, the dot pattern (1) is generated and disposed.

11. An information input and output method by use of a dot pattern of claim 1, characterized in that,
in order to define a region with no information in said dot pattern (1), or in order not to import different data in respective regions separated by a border,
as a dummy dot (5) in which data is not defined, disposed is a dot at a central position of the lattice dots (4) of four points.

12. An information input and output method by use of a dot pattern of claim 1, characterized in that,
when said dot pattern (1) is imported as image data by a camera,
after calculated were X, Y coordinate values at a position of the key dot (2) which is a representative point of information,
by supplementing coordinate values by a direction of the dot pattern (1) which is obtained from the key dot (2) increment values of the X, Y coordinate values at an adjacent representative point and a distance from an image pickup center to the key dot (2) whose X, Y coordinate values were calculated,
the X, Y coordinate values at the image pickup center are calculated.

13. An information input and output method by use of a dot pattern of claim 1, characterized in that,
when a block of said dot pattern (1) is imported as image data by a camera, in such a region that identical data is defined in each block or such a region that X, Y coordinate values are defined,
by starting to read from the information dot (3) which is located at a circumference around the image pickup center of said camera, reading the information dot (3) sequentially, and
reading the information dot (3) which corresponds to one block portion, the dot pattern (1) is read at a minimum area from the image pickup center of said camera, and data at the image pickup center position is calculated.

14. An information input and output method by use of a dot pattern of claim 1, characterized in that,
when said dot pattern (1) is read as image data by a camera, on the occasion that there occurs a partial error as to the information dot (3), read is an information dot (3) which corresponds to the above-mentioned information dot (3) and is the closest, and an error correction is carried out.

15. An information input and output method by use of a dot pattern of claim 1, characterized in that, said block is divided into sub-blocks, and individually independent information is given to each sub-block, and thereby, the dot pattern (1) is read at a smaller area than said block unit, from the image pickup center of said camera, and also, with respect to each sub-block, an error check and an error correction are carried out.

16. An information input and output method by use of a dot pattern of claim 1, characterized in that, the information dot (3) is disposed within the lattice dots (4) of four points.

* * * * *